United States Patent [19]

Eichenauer et al.

[11] Patent Number: 5,041,485
[45] Date of Patent: Aug. 20, 1991

[54] STABILIZER DISPERSIONS

[75] Inventors: Herbert Eichenauer, Dormagen; Karl-Erwin Piejko, Bergisch-Gladbach; Christian Lindner; Adolf Schmidt, both of Cologne; Karl-Heinz Ott, Leverkusen, all of Fed. Rep. of Germany

[73] Assignee: Bayer Aktiengesellschaft, Leverkusen, Fed. Rep. of Germany

[21] Appl. No.: 556,622

[22] Filed: Jul. 23, 1990

[30] Foreign Application Priority Data

Aug. 3, 1989 [DE] Fed. Rep. of Germany ....... 3925634

[51] Int. Cl.$^5$ ............................ C08K 5/11; C08K 5/12
[52] U.S. Cl. .................................. 524/285; 252/404; 252/405; 252/406; 252/407; 252/400.24; 252/400.22; 524/295; 524/299; 524/306; 524/314
[58] Field of Search ............... 524/285, 295, 299, 306, 524/314; 252/404, 405, 406, 407, 400.24, 400.22; 560/117, 119, 120, 127, 193, 194

[56] References Cited

U.S. PATENT DOCUMENTS

| 2,717,880 | 9/1955 | Sullivan | 252/404 |
| 2,761,784 | 9/1956 | Hall | 252/407 |
| 3,019,269 | 1/1962 | Clough | 252/406 |
| 3,052,562 | 9/1962 | Ferrante | 252/404 |
| 3,285,855 | 11/1966 | Dexter et al. | 524/291 |
| 3,297,619 | 1/1967 | Bluhm et al. | 252/404 |
| 3,463,731 | 8/1969 | Ecke et al. | 252/52 |
| 3,476,698 | 11/1969 | Osterrieth et al. | 260/23 |
| 3,563,949 | 2/1971 | Habeck et al. | 260/45.95 |
| 3,580,850 | 5/1971 | Dupre | 252/400.24 |
| 3,962,123 | 6/1976 | Battista et al. | 252/406 |
| 4,077,911 | 3/1978 | Okumura et al. | 252/407 |
| 4,088,594 | 5/1978 | Fernley et al. | 252/407 |
| 4,772,743 | 9/1988 | Schmidt et al. | 560/127 |
| 4,792,443 | 12/1988 | Filomeno | 252/404 |

FOREIGN PATENT DOCUMENTS 326829 8/1989 European Pat. Off. .
1261029 1/1972 United Kingdom .

Primary Examiner—Veronica P. Hoke
Attorney, Agent, or Firm—Connolly and Hutz

[57] ABSTRACT

Dispersions of stabilizers for plastics in water which contain special reaction products of diols and carboxylic acid anhydrides as auxiliary emulsifiers, and which are characterized by simple preparation, stability and good effectiveness in chemical materials.

3 Claims, No Drawings

STABILIZER DISPERSIONS

The invention relates to dispersions of stabilisers for plastics in water which contain special reaction products of diols and carboxylic acid anhydrides as auxiliary emulsifiers. The dispersions are characterised by simple preparation, stability and good effectiveness in chemical materials.

Stabilisers are regularly added to chemical materials, such as rubbers and thermoplastics, for example to improve the thermal stability and stability to weathering in use and processing. These stabilisers can be added during compounding of the melt or even during the preparation or working up of the polymers, which are the raw material for the chemical materials. If the raw materials are obtained as dispersions, these stabiliser dispersions can be admixed in this form. The mixture is then worked up to the chemical material—for example to a powder or granules. Possible damage to the polymers during purification and working up are thus reduced by the presence of the stabilisers.

However, the stabiliser dispersions (in water) required for this have to satisfy certain requirements; these include homogeneity, fine dispersibility, good absorption behaviour, stability of the dispersion, high concentrations of active ingredients. To satisfy all requirements, auxiliary materials must be used in the preparation of the stabiliser dispersions, for example emulsifiers. Only those emulsifiers which do not have a disadvantageous effect on the properties of the chemical materials, but which can emulsify stabilisers and produce the above-mentioned properties, can be used.

It has been found that special reaction products of diols and carboxylic acid anhydrides are suitable for preparing stabiliser dispersions having advantageous properties.

The object of the invention is to provide dispersions of stabilisers containing water, organic stabilisers and an emulsifier, which has been obtained by reacting 1 mole of a diol of the formula I $$HO-M-OH \quad (I)$$

and

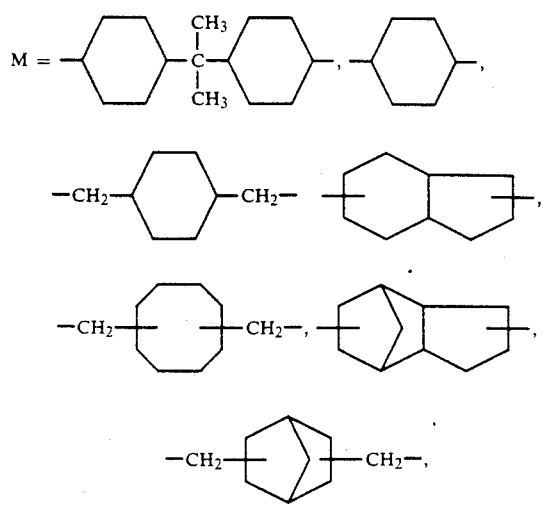

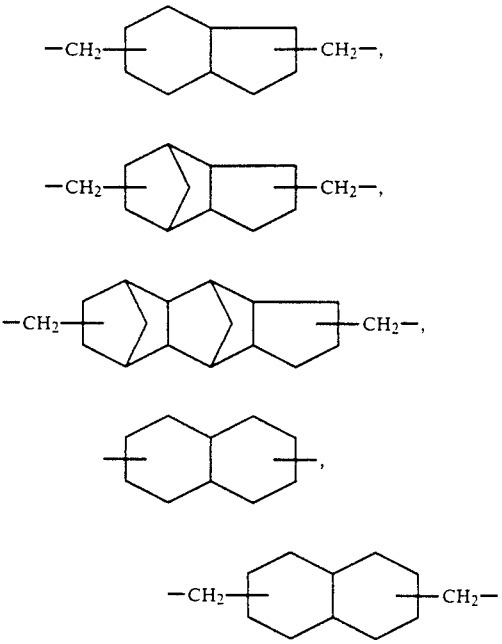

with 2 moles of carboxylic acid anhydride of the formulae II, III, IV or mixtures thereof

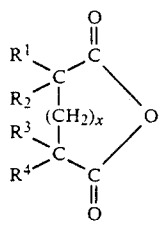

II

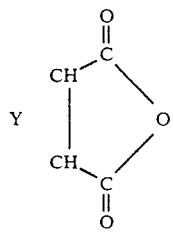

III

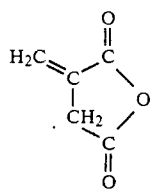

IV wherein when X=0
 $R^1$, $R^2$, $R^3$ and $R^4$ denote hydrogen or
 $R^1$ and/or $R^3$ denote $C_1$ to $C_{35}$-alkyl or alkenyl and the remaining radicals $R^1$ to $R^4$ denote hydrogen or
 $R^1$ and $R^4$ together denote a chemical bond and $R^2$ and $R^3$ denote hydrogen or
 $R^1$ and $R^4$ together denote a chemical bond and $R^2$ and $R^3$ together with the carbon atoms to which they are bonded, denote an o-phenylene group, when x=1
 $R^1$, $R^2$, $R^3$, $R^4$ denote hydrogen and $$Y = \begin{matrix} \diagup CH_2 \diagdown \\ CH_2 \phantom{xx} CH_2 \\ \phantom{xx} | \phantom{xxx} | \\ \diagdown CH_2 \diagup CH_2 \end{matrix} \phantom{xx} \begin{matrix} \diagup CH_2 \diagdown \\ CH_2 \phantom{xx} CH \\ \phantom{xx} || \phantom{xxx} || \\ \diagdown CH_2 \diagup CH \end{matrix}$$

$$\begin{matrix} \diagup CH \diagdown \\ \phantom{xx} / \phantom{x} \diagdown CH_2 \\ CH_2 \phantom{x} | \\ \phantom{xx} \diagdown \phantom{x} / CH_2 \\ \diagdown CH \diagup \end{matrix} \phantom{xx} \begin{matrix} \diagup CH \diagdown \\ \phantom{xx} / \phantom{x} \diagdown CH \\ CH_2 \phantom{x} || \\ \phantom{xx} \diagdown \phantom{x} / CH \\ \diagdown CH \diagup \end{matrix}$$

in the melt at temperatures of 100° C. to 300° C. in inert gas and with subsequent transfer into alkali salts or ammonium salts.

Particularly suitable emulsifiers are compounds of the formula V

V where A = alkali metal, ammonium, and of the formula VI

VI where A = alkali metal, ammonium.

The reaction products to be used as emulsifiers according to the invention are obtained by reacting a cycloaliphatic diol of the formula I, or a mixture of such diols, with two moles of a cycloaliphatic anhydride of the formulae II, III, IV, or a mixture of such anhydrides, by melting the components together at temperatures of 100° C. to 300° C., preferably 120° to 220° C., in inert gas, preferably nitrogen, and with subsequent transfer into alkali salts or ammonium salts, by dissolving the acidic reaction products in aqueous alkali solution or aqueous ammonia solution.

Examples of suitable diols are:
2,2-bis-(4-hydroxycyclohexyl)-propane
1,4-cyclohexanediol
1,4-bis-hydroxymethylcyclohexane
bis-hydroxymethyl-hexahydro-4,7-methanoindane
  (commercially available as "TDC-diol", prepared by hydroformylation of dicyclopentadiene)
bis-hydroxymethyl-bicyclo-(4,3,0)-nonane
bis-hydroxymethyl-norbornane
bis-hydroxymethyl-cyclooctane.

These diols are isomer mixtures in most cases.
Examples of suitable anhydrides are:
hexahydrophthalic acid anhydride
tetrahydrophthalic acid anhydride
5-norbornene-2,3-dicarboxylic acid anhydride
norbornane dicarboxylic acid
maleic acid anhydride
itaconic acid anhydride.

The two anhydrides mentioned last are preferably used in combination with saturated anhydrides.

The reaction which proceeds during melting may be represented as follows:

after neutralising with alkali hydroxide or aqueous ammonia, the reaction products are present in the form of the salts A = alkali metal, preferably Na, K, ammonium.

The reaction products of the invention can be used in the form of their salts like conventional anionic emulsifiers, in particular in the form of aqueous alkali solutions having concentrations of 2–50 wt. %, in particular 5–20 wt. %.

Preferred stabilisers in the dispersions of the invention are known stabilisers, such as phenolic antioxidants, phosphorus compounds, nitrogen compounds and sulphur compounds.

Examples of phenolic antioxidants are:
2,6-di-t-butyl-4-methylphenol, 2,4,6-tri-t-butylphenol, 2,2'-methylene-bis-(4-methyl-6-t-butylphenol),
2,2'-thio-bis-(4-methyl-6-t-butylphenol),
4,4'-thio-bis-(3-methyl-6-t-butylphenol, 4,4'-butylidene-bis(6-butyl-3-methylphenol),
4,4'-methylene-bis-(2,6-di-t-butylphenol), 2,2'-methylene-bis[4-methyl-6-(1-methylcyclohexyl)phenol], tetrakis [methylene3-(3,5-di-t-butyl-4-hydroxyphenyl)-propionate]methane, 1,3,5-trimethyl-2,4,6-tris(3,5-di-t-butyl-4-hydroxybenzyl)benzene, N,N'-hexamethylene-bis(3,5-di-t-butyl-4-hydroxy-hydrocinnamic acid amide),
octadecyl-3-(3,5-di-t-butyl-4-hydroxyphenyl)propionate, 1,3,5-tris(3,5-di-t-butyl-4-hydroxybenzyl-)isocyanurate, 1,1,3-tris(5-t-butyl-4-hydroxy-2-methylphenyl)butene, 1,3,5-tris-(3,5-di-t-butyl-4-hydroxybenzyl)mesitylene, ethylene glycol-bis[3,3-t-butyl-4'-hydroxyphenyl)butyrate] and ethylene glycol-bis(3'-t-butyl-4'-hydroxyphenyl)butyrate], 2,2'-thodiethylbis-(3,5-di-t-butyl-4-hydroxyphenyl)-propionate, di-(3-t-butyl4'-hydroxy-5-methylphenyl)-dicyclopentadiene, 2,2'-methylenebis-(4-methyl-6-cyclohexylphenol), 1,6-hexanediol-bis-3-(3,5di-t-butyl-4-hydroxyphenyl)propionate, 2,4-(n-octylthio)-6-(4hydroxy-3,5-di-t-butylanilino)-1,3,5-triazine, diethyl 3,5-di-t-butyl-4-hydroxybenzyl-phosphonate, triethylene glycol-bis-3-(t-butyl-4-hydroxy-5-methylphenyl)-propionate.

Examples of suitable phosphorus compounds are: distearylpentaerythritol diphosphite, tris-(nonylphenyl)-phosphite, tetrakis-(2,4-di-t-butyl-phenyl4,4'-biphenyl-ylenediphosphonite, tris-(2,4-di-t-butylphenyl)phosphite, neopentyl glycol triethylene glycol diphosphite, diisododecyl-pentaerythritol diphosphite, tristearylphosphite, triphenylphosphite.

Examples of nitrogen compounds are preferably aromatic amines, such as 4,4'-di-t-octyldiphenylamine, 4,4'-di-($\alpha,\alpha$-dimethylbenzyl)-diphenylamine, phenyl-$\beta$-naphthylamine, N-isopropyl-N'-phenyl-p-phenylenediamine, N-phenyl-2-naphthylamine, phenyl-2-aminonaphthaline.

Examples of sulphur compounds are $\beta$-thioethers of esters of propionic acid, higher di-alkyl-$\beta$-thiodipropionates, linear thiodialkanoate polyesters, esters of alkylthiobutyrates, phenolic compounds in which aromatic nucleii are linked by means of a thioether group. Thiodipropionates and aromatic thioethers having molecular weights up to 2,000 are preferred. Sulphur compounds are known as stabilisers (see for example U.S. Pat. No. 4,321,191).

Combinations of at least two, preferably three, different stabilisers, for example combinations of phenolic stabilisers with sulphur compounds, combinations of phenolic stabilisers with phosphorus compounds, are preferred according to the invention.

A further object of the invention is the use of the stabiliser dispersions of the invention to improve thermoplastic moulding compositions. Examples of suitable thermoplastics are homopolymers and copolymers of styrene, $\alpha$-methylstyrene, p-methylstyrene, p-halogenstyrene, acrylonitrile, methacrylonitrile, alkylacrylates, alkylmethacrylates, vinylchloride, vinylfluoride, vinylidenechloride, vinylether, vinylester, ethylene, propylene, butadiene, isoprene, chloroprene, maleic imides, maleic acid anhydride, maleates, maleic acid half esters, acrylic acid, methacrylic acid, acrylamide, methacrylamide; homopolymers and copolymers (including graft polymers) of styrene, $\alpha$-methylstyrene, acrylonitrile, $C_1$-$C_8$-alkylacrylates, $C_2$-$C_6$-alkylmethacrylates, butadiene or isoprene are preferred; ABS polymers, that is acrylonitrile-butadiene-styrene copolymers and graft polymers are particularly preferred.

Stabilised thermoplastics may be prepared by mixing a polymer dispersion with the stabiliser dispersion. Before working up the dispersion mixture, this may still be kept in motion (for example be stirred) for up to 24 hours to promote the absorption of the stabilisers onto the polymer particles. If the thermoplastic itself is a mixture (for example a styrene-acrylonitrile copolymer mixed with a graft polymer of styrene and acrylonitrile on polybutadiene, that is an ABS plastic), the stabiliser can then also be incorporated into one component of the thermoplastic and then added to the second, for example a dispersion of one component can be mixed with the dispersion of the stabiliser, worked up and added to the second component by melt compounding.

The stabiliser dispersions of the invention may be prepared in a manner known per se, preferably as follows:

The stabilisers are melted (with stirring, maximum temperature 100° C.), then a warm aqueous emulsifier solution is added and the mixture is stirred until a stable dispersion has formed. Low melting point stabilisers may also be introduced directly into a hot aqueous emulsifier solution. Conventional, effective stirring apparatus (for example fast stirrers) or spraying apparatus, which are particularly effective as dispersers because of high shearing ratios, are used for stirring and dispersing. The emulsifiers are preferably used in amounts up to 15 wt. %, in particular up to 10 wt. %, relative to the stabilisers to be dispersed. The amounts of water may be selected so that dispersions having a stabiliser concentration of up to 60 wt. % are produced. It may be useful to also add auxiliaries, such as salts or solvents, to the dispersions, if the melting points of the stabilisers are to be reduced or if the dispersions are to be particularly finely dispersed.

The dispersions of the invention have some viscosity or are slightly viscous and have good storage stability and homogeneity. They can easily be mixed with thermoplastic dispersions; the stabiliser dispersion does not coagulate prematurely. The thermoplastics of the invention are characterised by improved aging resistance and a lower degree of fogging; the processability is not impaired.

EXAMPLES

Emulsifiers used

A: Bis-Na salt of the reaction product of 1 mole of perhydrobisphenol A and 2 moles of hexahydrophthalic acid anhydride
B: Na oleate
C: Polyethoxylated nonylphenol I) Preparation of the stabiliser dispersions I 1) 100 parts by weight of octadecyl-3-(3,5-di-tert.-butyl-4-hydroxyphenyl)-propionate (Irganox 1076 from Ciba-Geigy) are melted together with 10 parts by weight of emulsifier B at 60°–65° C. and metered slowly into 90 parts by weight of water at 60°–65° C., which contains a stoichiometric amount of sodium hydroxide (1.44 g, 98.8% strength), with vigorous stirring. After 5 minutes, the resulting emulsion is cooled to room temperature without interrupting the stirring. The emulsion contains 50 wt. % of active ingredient.

After 5 hours, separation into aqueous phase and solid begins.

I 2) 50 parts by weight of octadecyl-3-(3,5-di-tert.-butyl-4-hydroxyphenyl)-propionate (Irganox 1076 from Ciby-Geigy) are added with vigorous stirring to a solution of 1.25 parts by weight of the emulsifier A, 5.5 parts by weight of sodium hydroxide (4% strength) and 43.25 parts by weight of water, which has been heated at 80°–90° C. After stirring for 5 minutes, the resulting emulsion contains 50 wt. % of active ingredient.

Separation of the emulsion into aqueous phase and solid cannot be detected even after 3 weeks.

I 3) A mixture of 16.1 parts by weight of dilaurylthiodipropionate (Irganox PS 800 from Ciba-Geigy), 9.1 parts by weight of 2,6-di-tert.-butyl-4-methylphenol and 2.3 parts by weight of 2.2'-methylene-bis-(4-methyl-6-cyclohexylphenol) is added with stirring to a solution of 2.5 parts by weight of the emulsifier C in 25 parts by weight of water and heated at 70°–80° C., then cooled to room temperature with stirring. The emulsion contains 50 wt. % of active ingredient.

Separation of the emulsion into aqueous phase and solid cannot be detected even after 3 weeks.

I 4) A mixture of 29.3 parts by weight of dilaurylthiodipropionate (Irganox PS 800 from Ciba-Geigy), 16.5 parts by weight of 2.6-di-tert.-butyl-3-methylphenol and 4.2 parts by weight 2,2'-methylene-bis(4-methyl-6-cyclohexylphenol) is added with vigorous stirring to a solution of 1.5 parts by weight of the emulsifier A, 6.6 parts by weight of sodium hydroxide (4% strength) and 32.9 parts by weight of water, which has been heated at 80°-85° C. It is then cooled to room temperature with stirring.

The emulsion contains 50 wt. % of active ingredient. Separation into aqueous phase and solid cannot be detected even after 3 weeks.

II) Polymer emulsions used

II 1) a) Emulsion of a styrene-acrylonitrile copolymer (SAN), prepared by free radical emulsion polymerisation, of a mixture of 72 wt. % of styrene and 28 wt. % of acrylonitrile using Na salt of disproportionated abietic acid as emulsifier; Staudinger index $[\eta]$ of the SAN resin: 0.75 in dimethyl formamide at 23° C.

b) Emulsion of a graft polymer of styrene and acrylonitrile on a coarse, particle-type, cross-linked butylacrylate rubber having an average particler diameter ($d_{50}$) of 0.5 um, prepared by free-radical emulsion graft polymerisation of a styrene-acrylonitrile (72/28) mixture in the presence of an acrylate rubber latex; composition of the graft polymer: 60 wt. % of acrylate rubber, 40 wt. % of styrene-acrylonitrile copolymer.

The emulsions a) and b) are mixed in the weight ratio a:b=1:2.

II 2) Emulsion of a graft polymer of styrene and acrylonitrile on a coarse, particle-type, cross-linked butadiene rubber having an average particle diameter ($d_{50}$) of 0.4 μm, prepared by free-radical emulsion graft polymerisation of a styrene-acrylonitrile (72/28) mixture in the presence of a polybutadiene latex; composition of the graft polymer: 50 wt. % of butadiene rubber, 50 wt. % of styrene-acrylonitrile copolymer.

The emulsions II 1.a) and II 2) are mixed in a weight ratio II 1.a):II 2)=6:4.

III) The emulsions II are mixed with the stabiliser emulsions I; wherein 1.2 parts by weight of stabiliser are used for 100 parts by weight of polymer.

After mixing the dispersions at room temperature, the mixtures are stirred for 3 hours.

The polymer is then removed in the form of a powder by coagulation using MgSO₄ solution, in the case of product II 1) at a pH of 8-10, in the case of product II 2) at a pH of 4-6, and working up conventionally, then it is washed and dried.

Table 1 shows the combinations prepared:

TABLE 1

| No. | Polymer according to example | | Stabiliser according to example | | | |
|---|---|---|---|---|---|---|
| | II (1) | II (2) | I 1 | I 2 | I 3 | I 4 |
| 1 | X | | X | | | |
| 2 | X | | | X | | |
| 3 | | X | | | X | |
| 4 | | X | | | | X |

IV Properties of the polymer

Fogging properties of the compositions III 1, III 2 (Window fogging test (3 hours/130° C.) in accordance with DIN 75201)

| III 1 | 58 gloss value in % |
| III 2 | 93 gloss value in % |

The polymers III are compounded with 0.2 parts by weight of pentaerythritol tetrastearate on a roller in the course of 15 minutes at 185° C.

Plates having a thickness of 4 mm are then prepared from the compounds by pressing at 190° C. for 10 minutes.

The approximate hue of the resulting plates was then assessed visually.

| Product | Discolouration(+) |
|---|---|
| III 1 | + |
| III 2 | ++ |
| III 3 | — |
| III 4 | ++ |

(+) ++ virtually no discolouration
+ slight discolouration
— clear discolouration

We claim:

1. Dispersions of stabilizers for thermoplastics in water comprising up to at least 60 percent by weight of at least one organic stabilizer, and an emulsifier in a concentration of about 2 to about 50 percent by weight, all based on the total weight of the composition, which has been obtained by reacting 1 mole of a diol of the formula I

HO—M—OH     (I)

and

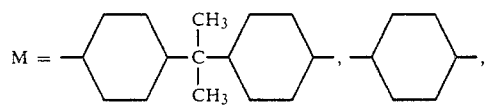

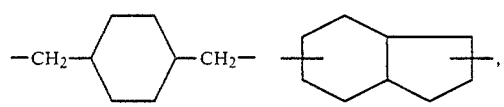

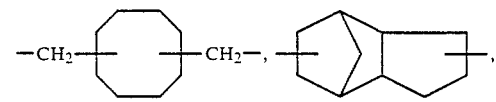

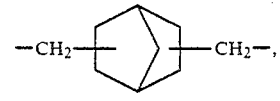

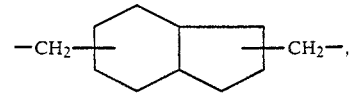

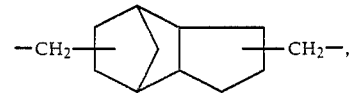

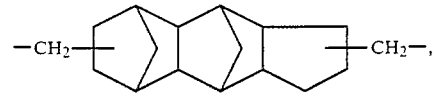

-continued

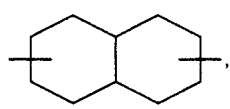

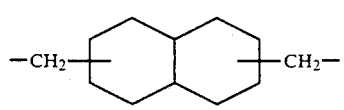

with 2 moles of carboxylic acid anhydride of the formulae II, III, IV or mixtures thereof

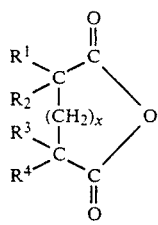
II

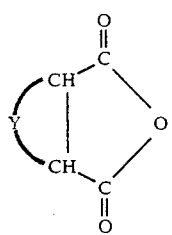
III

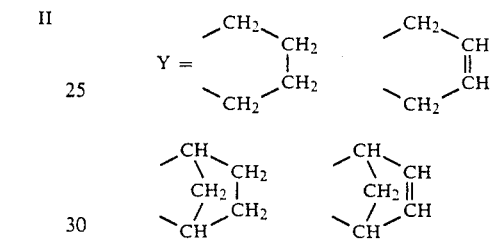
IV wherein when X=0
$R^1$, $R^2$, $R^3$ and $R^4$ denote hydrogen or
$R^1$ and/or $R^3$ denote $C_1$ to $C_{35}$-alkyl or alkenyl and the remaining radicals $R^1$ to $R^4$ denote hydrogen or
$R^1$ and $R^4$ together denote a chemical bond and $R^2$ and $R^3$ denote hydrogen or
$R^1$ and $R^4$ together denote a chemical bond and $R^2$ and $R^3$ together with the carbon atoms to which they are bonded, denote an o-phenylene group, when x=1
$R^1$, $R^2$, $R^3$, $R^4$ denote hydrogen and $$Y = \begin{array}{c}\text{CH}_2\\ \diagup \quad \diagdown \text{CH}_2 \\ \quad | \\ \diagdown \quad \diagup \text{CH}_2 \\ \text{CH}_2\end{array} \quad \begin{array}{c}\text{CH}_2\\ \diagup \quad \diagdown \text{CH} \\ \quad \| \\ \diagdown \quad \diagup \text{CH} \\ \text{CH}_2\end{array}$$

$$\begin{array}{c}\text{CH}\\ \diagup \quad \diagdown \text{CH}_2 \\ \text{CH}_2 | \\ \diagdown \quad \diagup \text{CH}_2 \\ \text{CH}\end{array} \quad \begin{array}{c}\text{CH}\\ \diagup \quad \diagdown \text{CH} \\ \text{CH}_2 \| \\ \diagdown \quad \diagup \text{CH} \\ \text{CH}\end{array}$$

in the melt at temperatures of 100° C. to 300° C. in inert gas and with subsequent transfer into alkali salts or ammonium salts.

2. Stabiliser dispersions according to claim 1, which contain phenolic antioxidants, phosphorus compounds, nitrogen compounds or sulphur compounds as stabilisers.

3. Thermoplastic moulding compositions having incorporated an effective amount of the stabilizer dispersion according to claim 1.

* * * * *